UNITED STATES PATENT OFFICE.

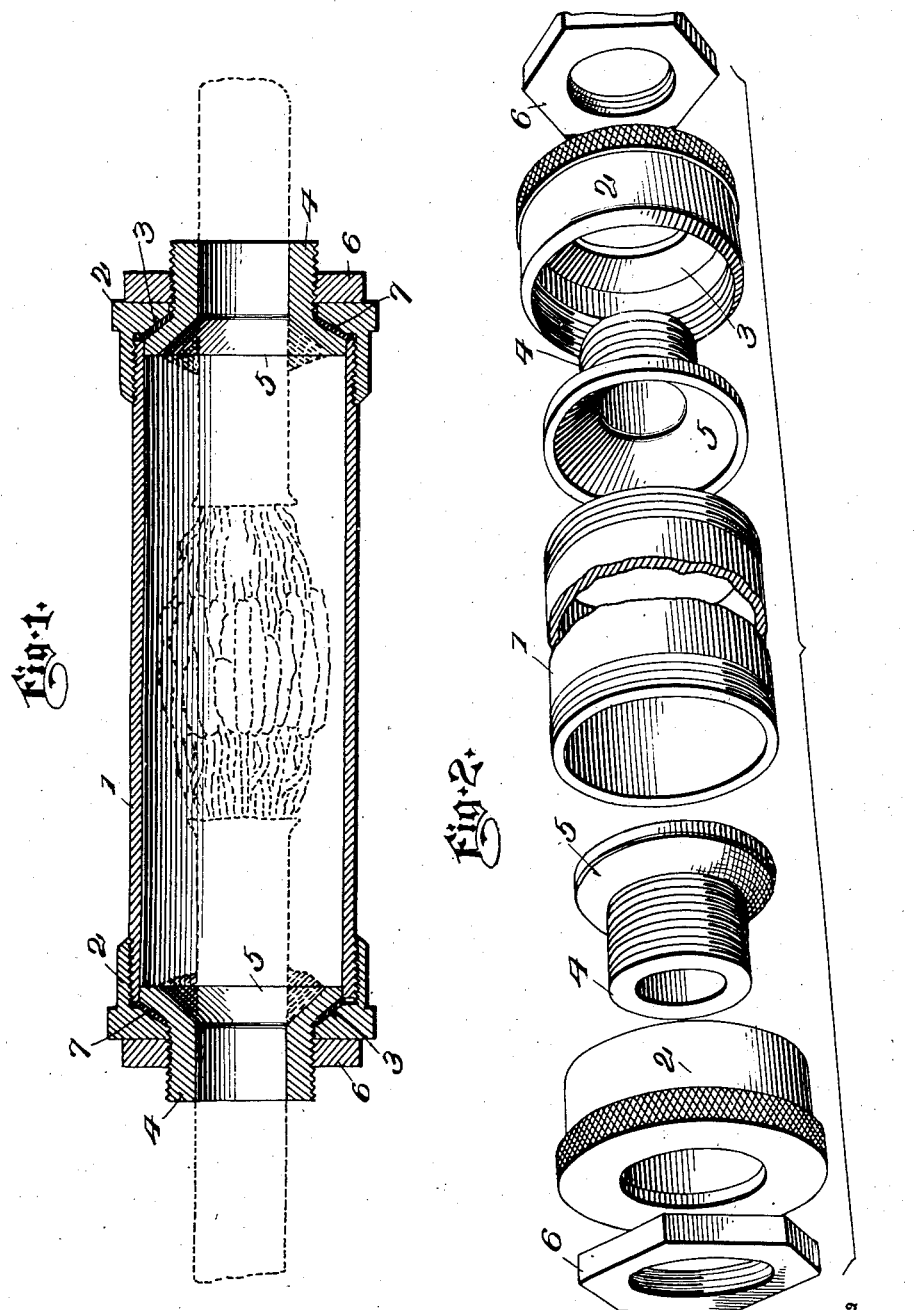

SAMUEL A. ARMSTRONG, OF NILES, AND PYRL T. AUMEND, OF WARREN, OHIO.

COUPLING FOR CABLE-SECTIONS.

1,075,079.  Specification of Letters Patent.  Patented Oct. 7, 1913.

Application filed August 14, 1912. Serial No. 715,099.

*To all whom it may concern:*

Be it known that we, SAMUEL A. ARMSTRONG, of Niles, in the county of Trumbull, State of Ohio, and PYRL T. AUMEND, of Warren, in the county of Trumbull and State of Ohio, have invented certain new and useful Improvements in Couplings for Cable-Sections; and we do hereby declare the following to be a full, clear, and exact description of the invention, such as will enable others skilled in the art to which it appertains to make and use the same.

The object of this invention is two-fold; first, to enable cable sections to be connected by unskilled labor; and second, to provide a simple and inexpensive device which will be air and water tight and free from moisture.

In the accompanying drawings Figure 1 is a longitudinal sectional view. Fig. 2 shows parts of the coupling disconnected.

Referring to the drawings, 1 designates a sleeve or barrel which is externally threaded at both ends. On these ends are screwed two detachable caps 2, each of which has a central opening surrounded by an inner beveled seat 3. Through the central openings of the two end caps project the reduced ends 4 of cupped members 5 the outwardly flared portions of which latter are beveled to fit snug against the seats 3 of the end caps. The beveled exposed faces of these cupped members extend from the peripheries thereof to the central reduced ends 4 which are externally threaded to receive nuts 6 for tightening the cupped members against their seats in the end caps. These cupped members are fastened to the ends of the cable sections at points near the ends thereof, being secured preferably by solder which may be roughly applied. In fact, that is what we especially seek by our present invention, to allow a rough application of solder to suffice. The solder is applied to the beveled face of the cupped members so as to be both concealed and protected.

In practice the coupling is employed in the following manner: The cable is severed where the break or leak occurs; then the two nuts are slipped on the two cable sections; then the two end caps are likewise placed on the cable section; then the two cupped members are soldered to the cable sections about three or four inches from the ends thereof, thereby permanently securing them and rendering them the only parts which are not readily detachable. The sleeve or barrel is now slipped over the end of one cable section and moved longitudinally thereof out of the way, whereupon the necessary connections are made between the cable wires, the sleeve or barrel being then moved into position to inclose the two cupped members. The end caps are then screwed home and the nuts are tightened on the threaded ends of the cupped members, making the coupling complete. Gaskets 7 may be placed between end-caps and the cupped members.

A coupling thus constructed and arranged is air and water tight and also moisture proof. The parts may be readily assembled and easily taken apart.

We claim as our invention:

1. A coupling for cable sections comprising two annular members designed to be affixed to the cable sections near the ends thereof, said annular members having outwardly flared portions, a sleeve through the ends of which the outwardly flared portions of said annular members may pass, said sleeve having screwed thereon detachable end seats for the outwardly flared portions of said annular members, which latter have threaded portions which project beyond the ends of the sleeve, and nuts on said threaded portions for locking the annular members to the sleeve.

2. A coupling for cable sections comprising two annular members designed to be affixed to the cable sections near the ends thereof, said annular members having outwardly flared portions, a cylindrical sleeve, into the ends of which said outwardly flared portions may be inserted and withdrawn, end caps detachably screwed on said sleeve and having inwardly projecting portions forming seats for the outwardly flared portions of said annular members, which latter on their inner faces at points inclosed by the sleeves, are designed to be secured to the cable sections, said annular members also having threaded portions projecting through said end caps, and nuts on said threaded portions.

In testimony whereof we have signed this specification in the presence of two subscribing witnesses.

SAMUEL A. ARMSTRONG.
PYRL T. AUMEND.

Witnesses:
FRED WILLIAMS,
H. A. BURGESS.